(12) United States Patent
Kawamae et al.

(10) Patent No.: US 7,647,542 B2
(45) Date of Patent: *Jan. 12, 2010

(54) RECORDING AND REPRODUCING DATA TO/FROM A RECORDING MEDIUM HAVING A USER DATA AREA AND AN INFORMATION AREA FOR STORING INFORMATION ABOUT THE RECORDING MEDIUM

(75) Inventors: Osamu Kawamae, Yokohama (JP); Taku Hoshizawa, Zushi (JP); Harukazu Miyamoto, Higashimurayama (JP); Shigeki Taira, Yokohama (JP); Yukari Katayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/183,677

(22) Filed: Jul. 31, 2008

(65) Prior Publication Data

US 2008/0297935 A1 Dec. 4, 2008

Related U.S. Application Data

(63) Continuation of application No. 11/822,466, filed on Jul. 6, 2007, which is a continuation of application No. 11/156,652, filed on Jun. 21, 2005, now Pat. No. 7,281,194, which is a continuation of application No. 10/117,212, filed on Apr. 8, 2002, now Pat. No. 6,918,079.

(30) Foreign Application Priority Data

Dec. 14, 2001 (JP) .............................. 2001-380840
Jan. 4, 2002 (JP) .............................. 2002-000032

(51) Int. Cl.
*H03M 13/00* (2006.01)

(52) U.S. Cl. ..................................................... 714/752

(58) Field of Classification Search .................. 714/752, 714/763, 769; 360/25, 31
See application file for complete search history.

(56) References Cited

U.S. PATENT DOCUMENTS 4,819,236 A    4/1989   Sako et al.

(Continued)

FOREIGN PATENT DOCUMENTS

JP           62-171324        7/1987

(Continued)

OTHER PUBLICATIONS

Japanese Office Action, issued in Japanese Patent Application No. JP2002-024921 dated on Jan. 6, 2009.

(Continued)

*Primary Examiner*—Esaw T Abraham
(74) *Attorney, Agent, or Firm*—McDermott Will & Emery LLP

(57) ABSTRACT

If a large minimum data unit for recorded data is used to record a small data amount of management information, the recording time is long, and furthermore when a WO (write once) is used as the recording medium, the number of recording operations is restricted. To solve the above problems, the present invention records data in a management area in units smaller than ordinary units for recorded data to suitably record information in a limited management area and thereby efficiently use the user data area. At that time, the present invention simplifies interleave processing usually applied to ordinary recorded data, and performs the simplified interleave processing on a data structure (for data of small size) of the present invention so as to ensure the signal processing compatibility between the ordinary data and data having the data structure according to the present invention.

6 Claims, 17 Drawing Sheets

U.S. PATENT DOCUMENTS

| | | | |
|---|---|---|---|
| 5,805,564 A * | 9/1998 | Kobayashi et al. | 369/275.3 |
| 5,835,509 A * | 11/1998 | Sako et al. | 714/755 |
| 5,966,368 A * | 10/1999 | Kobayashi et al. | 369/275.3 |
| 6,275,783 B1 | 8/2001 | Okamura | |
| 6,678,859 B1 | 1/2004 | Senshu | |
| 6,760,878 B2 * | 7/2004 | Yashima | 714/755 |
| 6,903,887 B2 * | 6/2005 | Asano et al. | 360/31 |
| 6,907,561 B2 * | 6/2005 | Kojima | 714/784 |
| 7,058,875 B2 * | 6/2006 | Jeon et al. | 714/769 |
| 7,369,746 B2 * | 5/2008 | Ueda et al. | 386/68 |
| 2002/0053051 A1 | 5/2002 | Hirayama | |

FOREIGN PATENT DOCUMENTS

| | | |
|---|---|---|
| JP | 2000-149427 | 5/2000 |
| JP | 2000-339868 | 12/2000 |
| WO | WO 00/07300 | 2/2000 |

OTHER PUBLICATIONS

Japanese Office Action issued in corresponding Japanese Patent Application No. 2002-024921, mailed on Feb. 6, 2007.

Japanese Office Action issued in Japanese Patent Application No. 2007-101242, filed May 12, 2009.

* cited by examiner

FIG.12

| b47 | b46 | b45 | b44 | b43 | b42 | b41 | b40 |
|-----|-----|-----|-----|-----|-----|-----|-----|
| CPM | CP_SEC | CGMS | | reserved for system use | | | |

| b39 | b38 | b37 | b36 | b35 | b34 | b33 | b32 |
|-----|-----|-----|-----|-----|-----|-----|-----|
| reserved for system use | | | | | | | |

| b31 | b30 | b29 | b28 | b27 | b26 | b25 | b24 |
|-----|-----|-----|-----|-----|-----|-----|-----|
| reserved for system use | | | | | | | |

| b23 | b22 | b21 | b20 | b19 | b18 | b17 | b16 |
|-----|-----|-----|-----|-----|-----|-----|-----|
| reserved for system use | | | | | | | |

| b15 | b14 | b13 | b12 | b11 | b10 | b9 | b8 |
|-----|-----|-----|-----|-----|-----|-----|-----|
| reserved for system use | | | | | | | |

| b7 | b6 | b5 | b4 | b3 | b2 | b1 | b0 |
|----|----|----|----|----|----|----|----|
| reserved for system use | | | | | | | |

RECORDING AND REPRODUCING DATA TO/FROM A RECORDING MEDIUM HAVING A USER DATA AREA AND AN INFORMATION AREA FOR STORING INFORMATION ABOUT THE RECORDING MEDIUM

This application is a Continuation of U.S. application Ser. No. 11/822,466, filed Jul. 6, 2007 which is a Continuation of U.S. application Ser. No. 11/156,652, filed Jun. 21, 2005, now U.S. Pat. No. 7,281,194, which is a Continuation of U.S. application Ser. No. 10/117,212, filed Apr. 8, 2002, now U.S. Pat. No. 6,918,079, claiming priority of Japanese Application Nos. 2001-380840, filed Dec. 14, 2001, and 2002-000032, filed Jan. 4, 2002, the entire contents of each of which are hereby incorporated by reference.

BACKGROUND OF THE INVENTION

1. Field of the Invention

The present invention relates to a recording/reproducing apparatus which records data on a recording medium having a large capacity and has an area for managing the data recorded on the recording medium. The present invention also relates to a recording/reproducing apparatus which records data in units having different sizes, and a recording/reproducing method and a recording medium therefor.

2. Description of the Related Art

Recording/reproducing apparatuses for CDs (Compact Discs) and DVDs (Digital Versatile Discs) using optical disks as their recording media are widely used and are expected to increase in their recording capacity.

FIG. 5 shows a data structure used in the user data area in a DVD. In the figure, parities are added to user data in two different directions. Reference numeral 51 denotes the user data, specifically, one recorded data block made up of 16 sectors, from sector 0 to sector 15. Reference numeral 52 denotes the PI parity added in the row direction, while reference numeral 53 denotes the PO parity added in the column direction. Since the parities are added in the row and column directions as shown in the figure, decreasing the number of the sectors (currently 16 sectors) or decreasing the number of pieces of the user data to be employed without changing the number of parities requires a significant change in the recorded data block structure. Further, if the method for adding the parities is changed, it is necessary to carry out different decoding operations for the ordinary parity and the parity for the altered data block structure in the reproduction, which complicates the configuration of the decode circuit and deteriorates the error correction capability. Therefore, practically, the data must be recorded in minimum record block units of 32K bytes even when information to be recorded is small. Thus, a small data unit is difficult to record in the data structure of the conventional DVD.

In the field of DVDs, recordable/reproduceable optical disks such as DVD-RAMs, on which data can be recorded a plurality of times, and DVD-Rs, on which data can be recorded only once, have been developed together with their recording/reproducing apparatuses.

In data recording on a disk, information for which data is recorded is recorded in a specific management area and then read out to carry out the control.

FIG. 6 shows areas on a DVD-R disk. The area consisting of a PCA (Power Calibration Area) and an RMA (Recording Management Area) indicated by reference numerals 31 and 32, respectively, is an R-information area, which is the management area for the recorded data. Reference numeral 33 denotes a read-in area, 34 denotes a user data recording area, and 35 denotes a readout area. Generally, the read-in area and the user data area are separated such that their border exists between 02FFFFh and 030000h in terms of ECC block (correcting block) addresses. Further, the size of the RMA area is determined such that the RMA area can record a predetermined number of ECC blocks.

SUMMARY OF THE INVENTION

As shown in FIG. 6, the management area has a capacity of a predetermined number of blocks to record management information.

With this arrangement, if a large minimum data unit for recorded data is used to record a small data amount of management information, the recording time is long, and furthermore when a WO (write once) is used as the recording medium, the number of recording operations which can be performed is restricted depending on the size of the recorded data in the management area. Since data is recorded in units of 32K bytes in a DVD, a 32K-byte area is allocated even to data whose size is less than 32K bytes. Thus, a 32K-byte recording area is consumed each time data is recorded. Therefore, when data is frequently recorded, unless there is storage space left in the management information recording area, it is not possible to record user data even if there is enough storage space left in the user data area. This problem becomes more serious when the user data area is increased by use of a technique providing higher density, etc.

The present invention has been devised in view of the above problem. It is, therefore, an object of the present invention to suitably record information in a limited management area so as to efficiently use the user data area when recording data.

The above problem can be alleviated by recording data in a management area in units smaller than ordinary units for recorded data.

Specifically, according to the present invention, a method for recording data on a recording medium comprises the steps of: combining predetermined n (n is an integer) number of pieces of data; adding error correcting code to the data; adding addresses to the data; arranging the data in a distributed manner; and, when management information is recorded in a management area, combining and recording predetermined m (m is an integer and smaller than n) number of pieces of data.

When reproducing data, the present invention combines data in different units each corresponding to an area in the above recording medium from which the (data) signals were reproduced.

Furthermore, when a plurality of record block sizes are used, the present invention records codes indicating the record block sizes onto the recording medium. By detecting each code, it is possible to carry out reproduction processing corresponding to each record block size.

BRIEF DESCRIPTION OF THE DRAWINGS

FIG. 12 is a diagram showing CPR_MAI in the data area in a DVD;

DETAILED DESCRIPTION OF THE PREFERRED EMBODIMENTS

Figure 1:
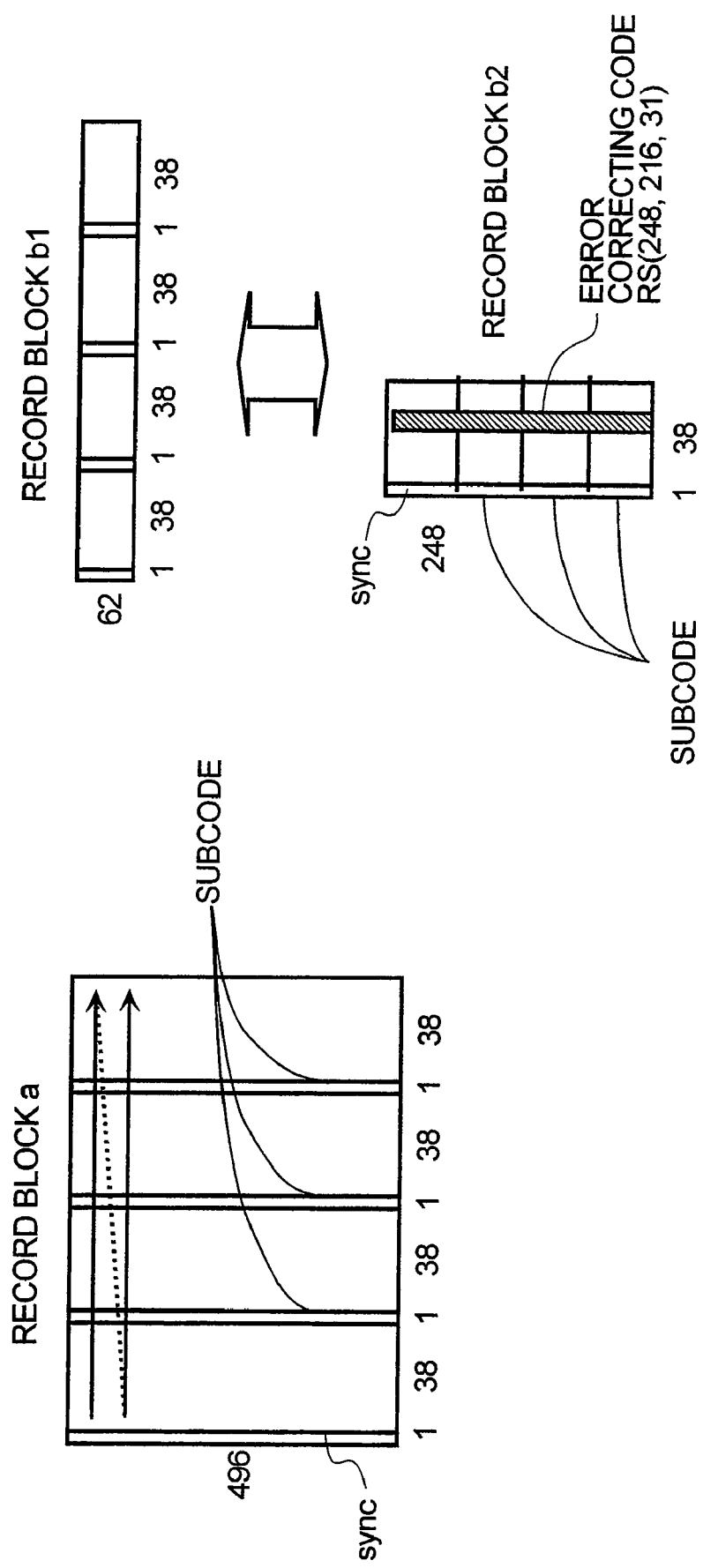
FIG. 1 is a diagram showing a method for forming a record block from a larger record block and recording the formed record block according to an embodiment of the present invention.

Symbols (reference numerals) mainly used in the figures indicate the following: 101 denotes signal input; 102 addition of parity; 103 addition of subcode; 104 interleave; 105 modulation; 106 a disk; 107 system control; 109 a semiconductor circuit for processing recording signals; 110 output; 111 a process of putting data together in predetermined units; 112 error correction; 113 address detection; 114 deinterleave; 115 demodulation; and 119 a semiconductor circuit for processing reproducing signals.

Figure 2:
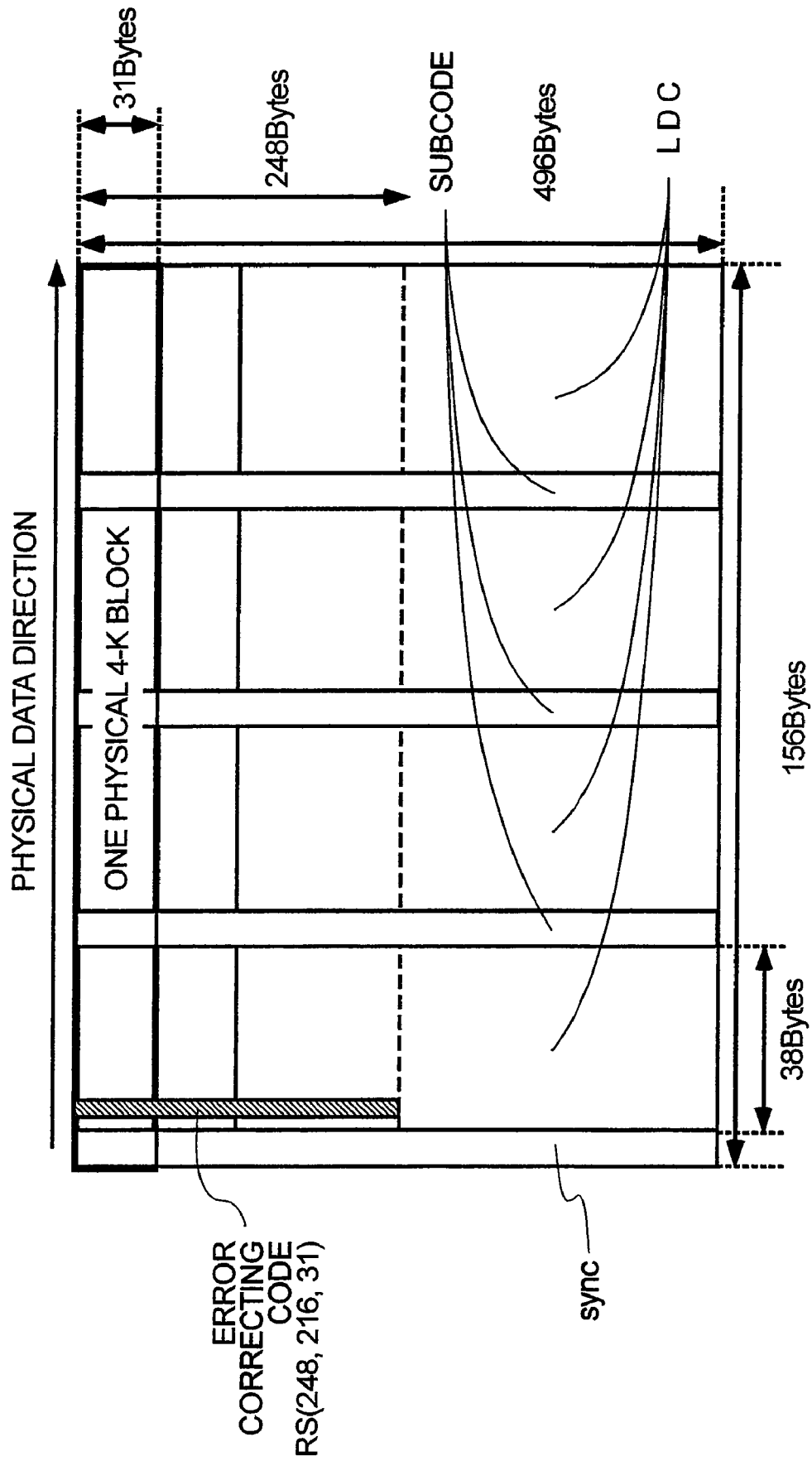
FIG. 2 is a diagram showing a data structure of a data unit of data to be recorded on a recording medium according to the embodiment.
Figure 3:
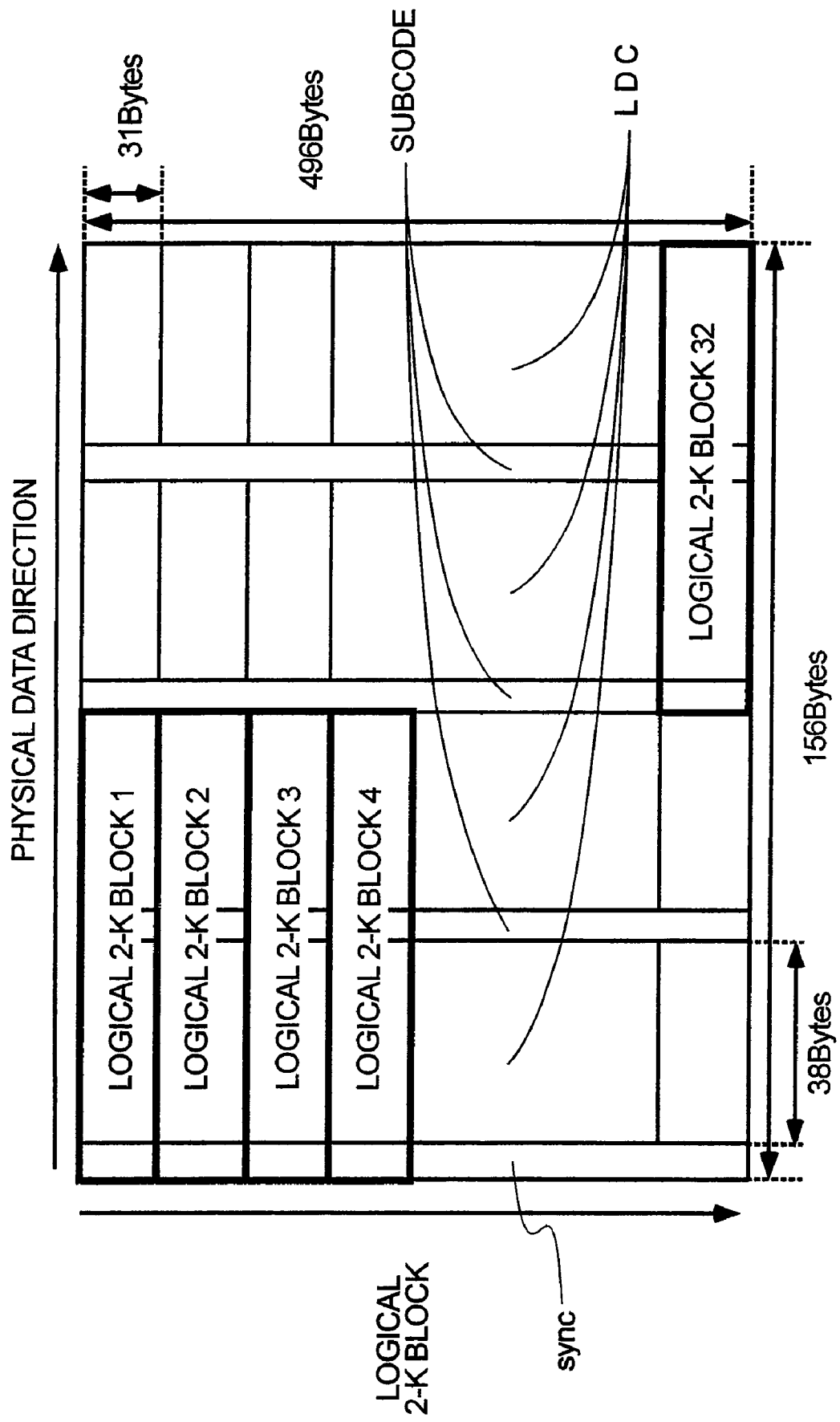
FIG. 3 is a diagram showing a data arrangement in which each 2K bytes of data is put together into one logical block using the record block shown in FIG. 2.
Figure 4:
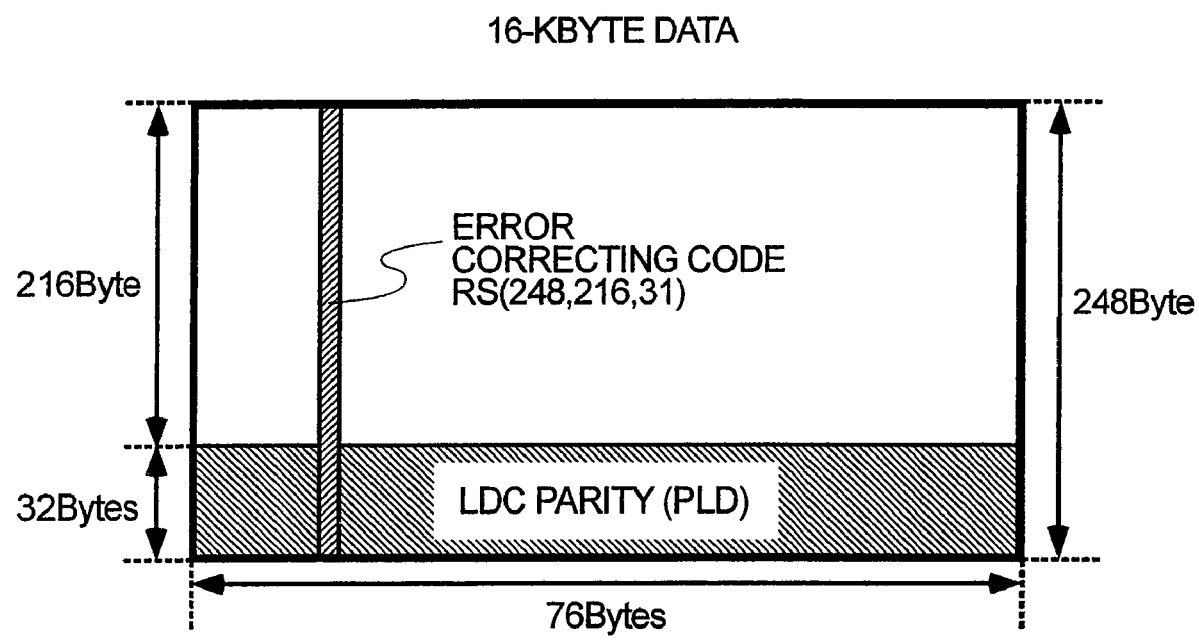
FIG. 4 is a diagram showing a structure of data obtained as a result of adding error correcting code to the 2K-byte logical blocks 1 to 4 included in the record block shown in FIG. 3.

A preferred embodiment of the present invention will be described below with reference to the accompanying drawings. FIGS. 2 and 3 show data structures used to record user data according to the present invention. FIG. 1 shows an example in which the size of a record block is changed according to the present invention. FIG. 4 shows a data arrangement obtained as a result of rearranging the data structure shown in FIG. 3 to actually record the data.

FIG. 2 shows a data structure of a record unit of data to be recorded on a recording medium according to the present invention. The following description assumes that the recording medium is an optical disk.

The record block comprises: in each column, 496 bytes; and in each row, a sync (synchronization signal) of one byte, data of 38 bytes, and 3 sets of a burst error detecting subcode of one byte and data of 38 bytes; totaling 77,736 bytes. The arrow indicates the direction in which data is recorded on a disk. The LDC (Long Distance Code) portions constitute user data and are obtained as a result of adding 32 parities to 216 pieces of data, using an RS (Reed Solomon) code. In the figure, the code runs sequentially as a single column indicated by the shaded portion. However, the code may be divided and arranged by means of interleaving.

FIG. 3 shows a data arrangement in which each 2K bytes of data is put together into one logical block using the record block shown in FIG. 2. Thus, 32 2K-byte logical blocks can be arranged using the 64K-byte record block. In addition to the above example, the logical blocks may be arranged such that each 2 blocks are aligned in a row.

FIG. 4 shows the structure of data obtained as a result of adding error correcting code to the 2K-byte logical blocks 1 to 4 shown in FIG. 3. As shown in the figure, the error correcting code RS (248, 216, 31) is vertically (in the column direction) added to the data. Thus, the figure shows a case in which the error correcting code is added to the vertically aligned logical blocks 1 to 4. However, the error correcting code may be added to the logical blocks 1, 16, 2, and 17 with the same effect. Thus, the present invention is not limited to a specific combination of logical blocks; any combination may be employed by means of regular interleaving.

FIG. 1 shows a method for forming and recording a record block smaller than that shown above.

As shown in FIG. 2, the record block a comprises: in each column, 496 bytes; and in each row, a sync of one byte, data of 38 bytes, and 3 sets of a burst error detecting subcode of one byte and data of 38 bytes; totaling 77, 736 bytes. The arrow indicates the direction in which the data is recorded on a disk. The record block b1 comprises: in each column, 62 bytes; and in each row, a sync of one byte, data of 38 bytes, and 3 sets of a burst error detecting subcode of one byte and data of 38 bytes, as in the case of the record block a; totaling 9, 672 bytes. The direction in which data is recorded on a disk is the same as that for the record block a.

Data of 2048 bytes and an error check code of 4 bytes collectively form a recorded data unit, and the data of the record block a is made up of 32 recorded data units. As for the record block b1, data of 2048*4 bytes and an error check code of 4*4 bytes collectively form its minimum recorded data unit. The minimum recorded data unit is rearranged, as indicated by the record block b2 in the figure, to form a structure (arrangement) similar to that of the record block a which includes RS code (error correcting code), making it possible to use the same method as that employed for the record block a for carrying out RAM control to temporarily store data for signal processing or performing error correction processing. That is, error correcting code and then a subcode are added to the structure of the record block b2. When recording the data, the data is recorded as the record block b1 (using the structure of the record block b1). Since the subcode is a code string of 62 bytes, it may be added as a single column or arranged by means of interleaving.

Incidentally, data of 2048 bytes are roughly 2K bytes. Accordingly, the record block b1 has a data structure for recording 8K bytes of data which includes 62 record block units each arranged in a row. However, the record block b1 is not limited to this specific data structure, that is, this specific number of bytes, 8K bytes. The record block b1 (that is, its data structure) may be of any size if it can be easily divided and rearranged to form the data structure of the record block a.

On the other hand, a data structure made up of small blocks such as those described above may make it impossible to interleave the data, deteriorating the error correction capability. To solve this problem, the same data may be recorded a plurality of times or error correcting parities may be added.

Figure 7:
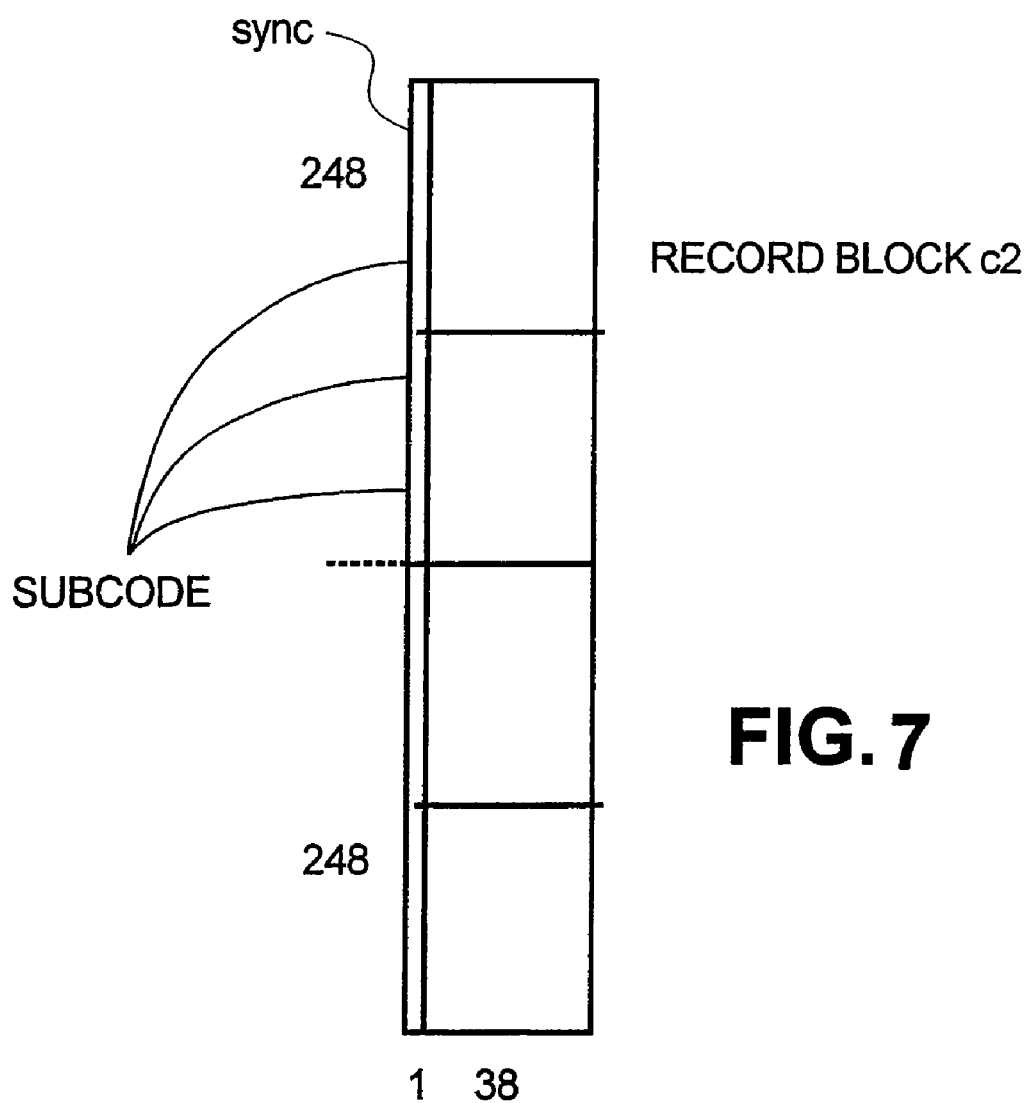
FIG. 7 is a diagram showing a 16K-byte recorded data structure formed from the 8K-byte recorded data structure shown in FIG. 1.
Figure 8:
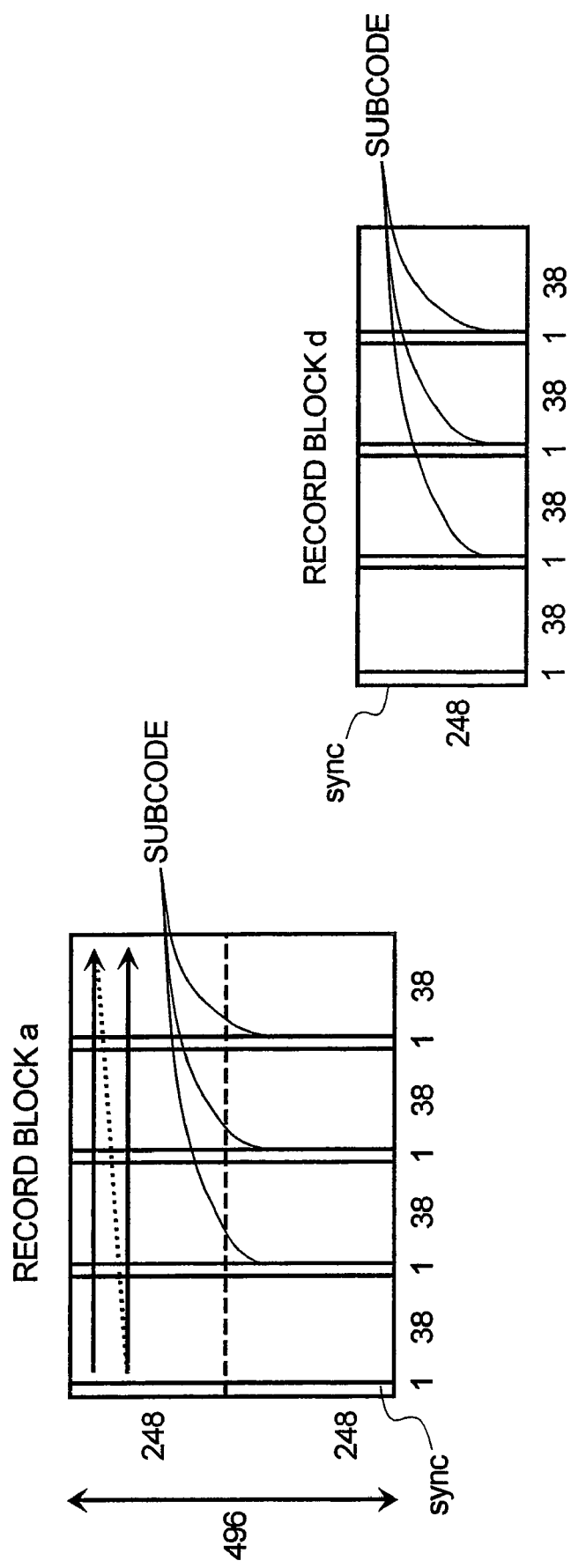
FIG. 8 is a diagram showing a 32K-byte recorded data structure formed from the 16K-byte recorded data structure shown in FIG. 7.

FIG. 7 shows a 16K-byte recorded data structure formed from the 8K-byte recorded data structure shown in FIG. 1. A 32K-byte recorded data structure also can be easily obtained from the 16K-byte recorded data structure using a similar method. FIG. 8 shows an area in the user data area of a DVD in which copy control information is recorded. In the figure, the area CGMS (Copy Generation Management System) records information on user data, and therefore is not required as management information data. Accordingly, management information may be recorded in this area by coding the size of data to be recorded into a few types of code and recording the code. For example, when 2 bits are assigned to the area CGM, the flag "00" may be used to indicate an 8K byte recorded data. The area for recording such information is not limited to the area CGMS. Any area can be used to record such information if it is used for user data and not included in the management area.

FIG. 8 shows a data structure larger than that shown above. As shown in FIG. 8, the record block d comprises 32K bytes of data, which is half of the 64K-byte record block a in size. Since DVDs record data in units of 32K bytes, a record block of this data size can easily be made compatible with a DVD system. With this record block, data to be recorded is added with parities and subcodes and then interleaved such that the data is distributed to enhance the burst error detecting capability. The subcodes may be added after the interleave instead of before the interleave. With the record block a, data is interleaved by adding parities to the data and then, for example, rearranging it. With this arrangement using an interleaving technique, when a burst error has occurred, two apparent burst errors half as long as the actual burst error are detected. Therefore, even in the case where data cannot be serially reproduced due to the burst error, the data may be corrected by use of the added parities if the apparent burst errors are within a distance of error correction by use of interleaving. To obtain such effect, the data is interleaved and then the subcodes added to the interleaved data are also interleaved to enhance the error correction capability.

Since the record block d includes data smaller than that of the record block a, the same interleaving technique as that for the record block a cannot be applied to the record block d. Accordingly, the subcodes are interleaved within 248 bytes. By using such a method, it is possible to form and record a record block of 32K bytes. In each of the above descriptions, data is put together in units of a number of bytes close to the nth power of 2 (n is an integer). This is not restrictive. To round a fraction, redundant data may be added to produce a number easy to use when combining data.

Figure 9:
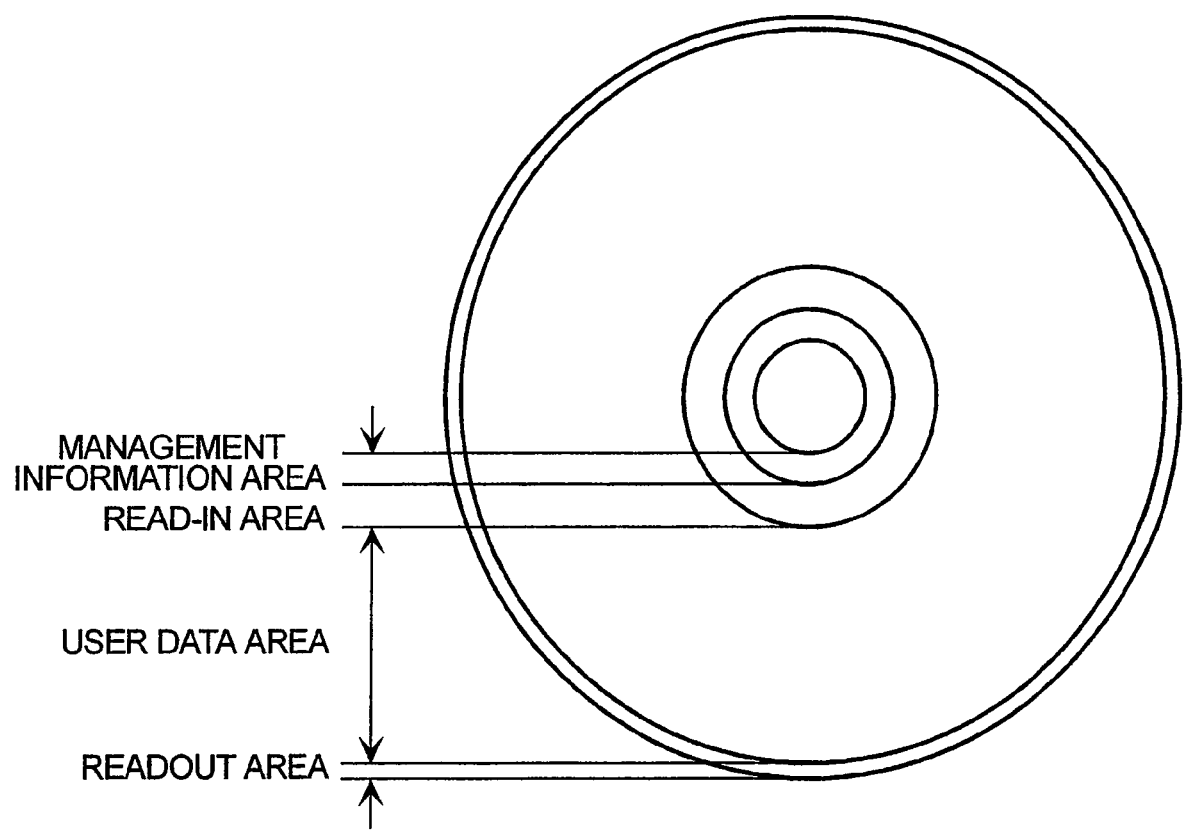
FIG. 9 is a diagram showing an example of how areas on a disk are actually assigned to data according to the embodiment of the present invention.

FIG. 9 shows an example of how data to be recorded according to the present invention is actually recorded on a disk. The recording disk has arranged thereon a management information area, a read-in area, a user data area, and a read-out area, and data is recorded in a predetermined format in each area. Data is recorded in predetermined record blocks having 64K bytes in the user data area. As for the management information area, data is recorded in record blocks having a block size smaller than 64K bytes, namely 4K bytes, 8K bytes, 16K bytes, or 32K bytes. By recording data as described above, it is possible to efficiently record management information in a limited area. It should be noted that even though the management area is provided inside the read-in area in FIG. 9, this relationship may be reversed.

Figure 5:
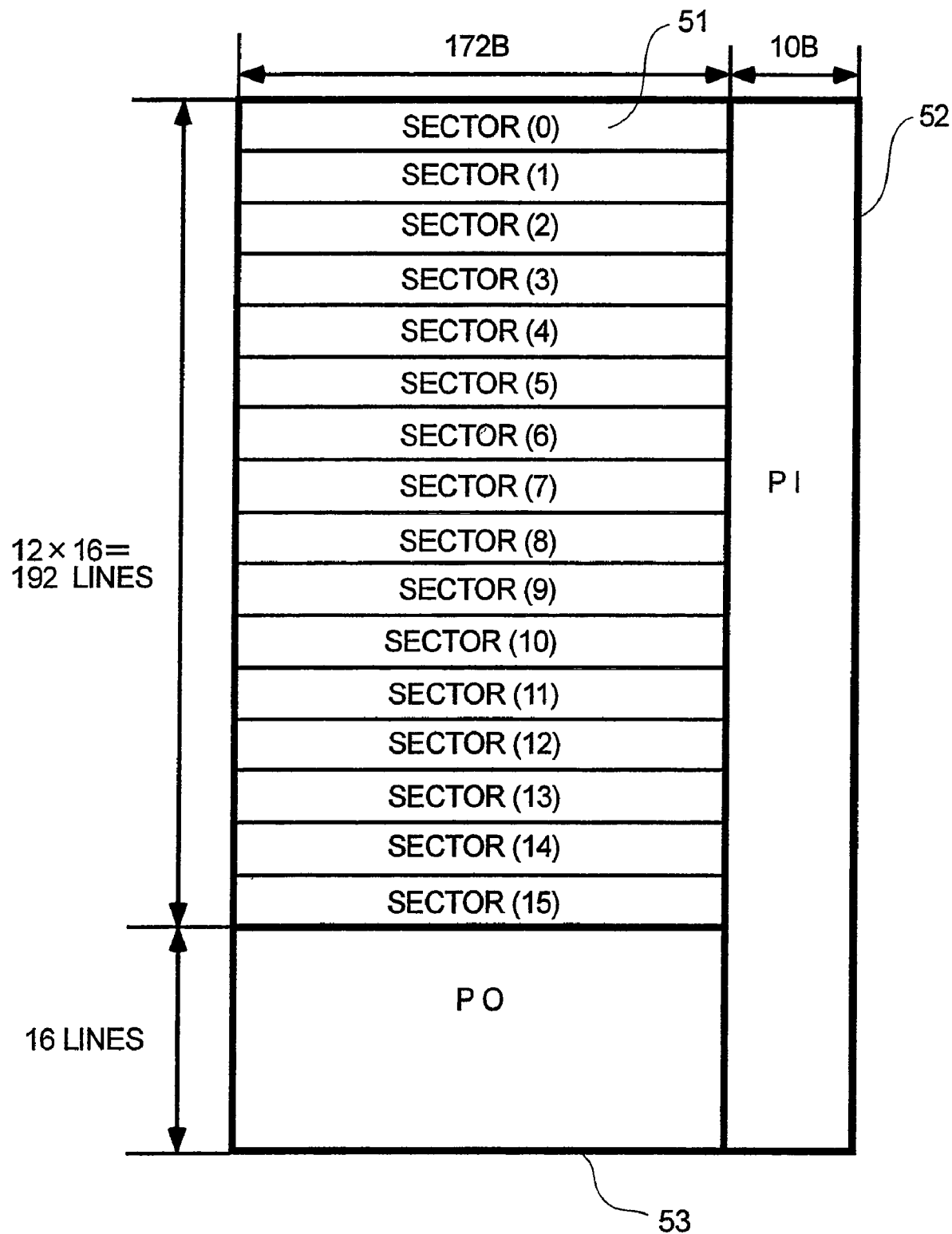
FIG. 5 is a diagram showing the data structure of user data in a DVD.
Figure 6:
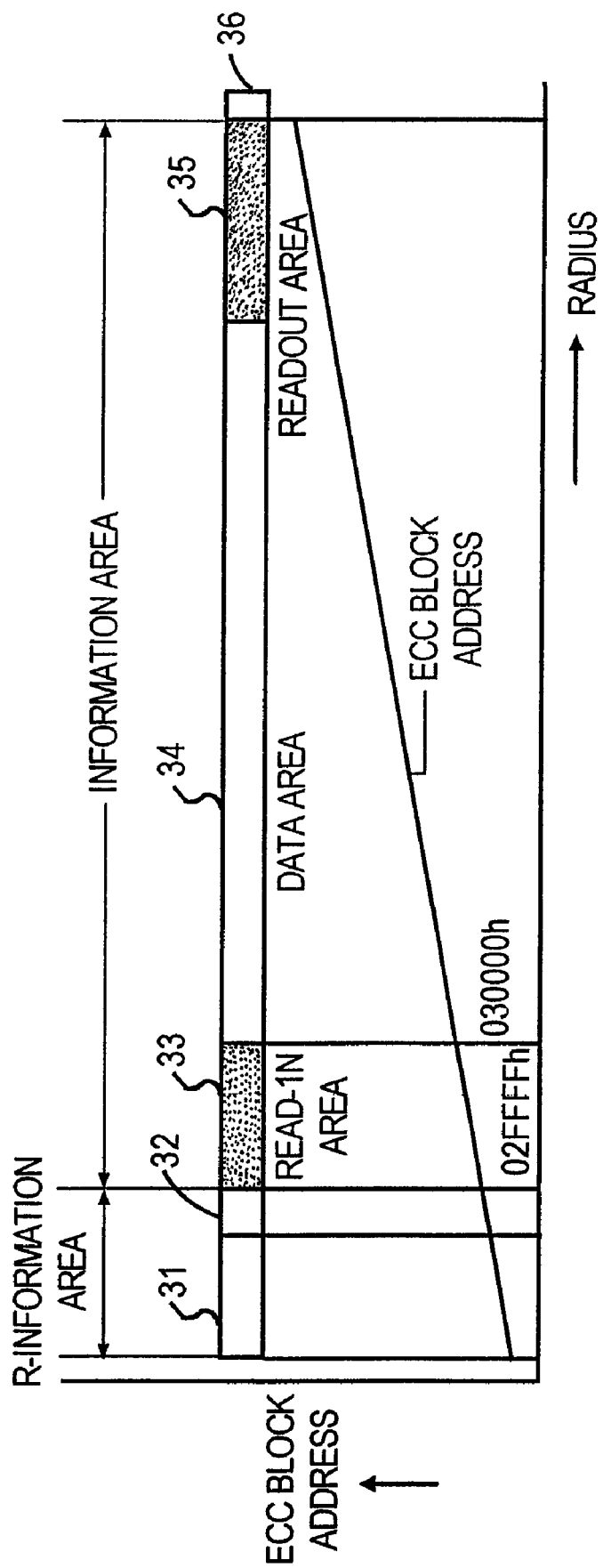
FIG. 6 is a diagram showing a configuration of areas on a DVD-R disk.

Furthermore, if it is known beforehand that there is not enough management area, it may be arranged such that a definition can be established to extend it. For example, the border between the read-in area and the user data area shown in FIG. 5 may not be fixed (even though it is fixed between 02FFFFh and 030000h in terms of ECC block addresses in the figure), and may be changed. In such a case, the position of the changed border can be recorded in the first portion of a specific area such as the management information area to extend the management area if it is known beforehand that a management area of large size is required.

Figure 10:
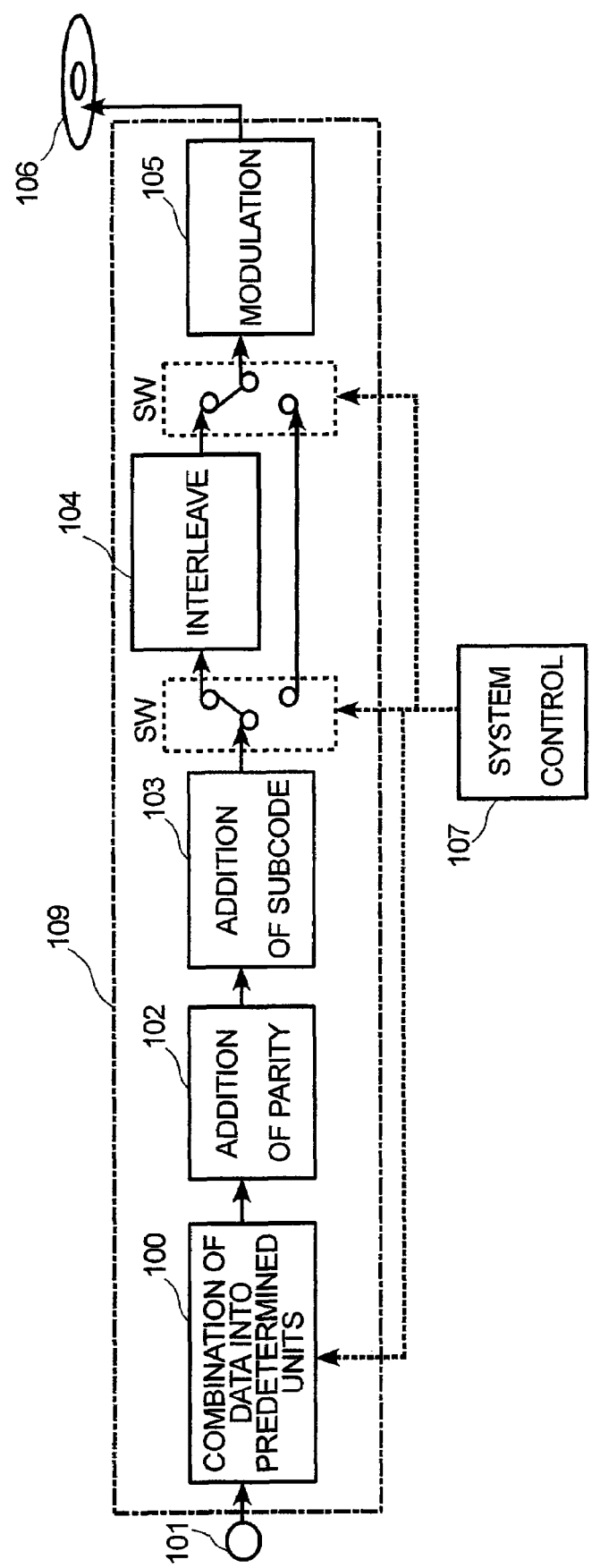
FIG. 10 is a diagram showing a configuration of a recording apparatus according to the present invention.

FIG. 10 shows a configuration of a recording apparatus according to the present invention. Reference numeral 101 denotes a signal input section for inputting data to be recorded; 102 an "addition of parity" section for adding error correcting code; 103 an "addition of subcode" section for adding information such as addresses in a distributed manner; 104 an interleave section for rearranging data; 105 a modulation section for recording data; and 106 a disk on which the data is recorded. Reference numeral 107 denotes a system control circuit for controlling the system, while 109 denotes a semiconductor circuit for processing recording signals. Though not shown, a recording means is provided to record data on a recording medium. The term "a recording means" here denotes, for example, an optical head. A recording means may further include a recording optical system and a laser for recording. The term "a combining means" here indicates a means for putting together data to be recorded on a recording medium in predetermined units so that parities can be added to the data. For example, the process (section) 100 for combining data into predetermined units shown in FIG. 10 is a combining means. It should be noted that if there are a plurality of different data units (that is, each data unit consists of a different number of bytes, etc.) in which data is put together, a different circuit may be used for each data unit, or alternatively a single circuit may be used which is capable of changing the number (of bytes) constituting the data unit. Further, an error correcting code adding means is a means for adding parities to data to be recorded on a recording medium. For example, the "addition of parity" section 102 shown in FIG. 10 is an error correcting code adding means. An error correction code adding means may include a mechanism for storing data in a RAM, etc. and writing/reading the data. It should be noted that if there are a plurality of different data units (that is, each data unit consists of a different number of bytes, etc.) in which data is put together, a different circuit may be used for each data unit as an error correcting code adding means, or alternatively a single circuit may be used for all different data units as an error correcting code adding means by switching among different data units or among different data string units (each having a different number of bytes, etc.).

The system is controlled such that when data to be recorded is management information and small, each piece of data entered from the signal input section is set to be small and is not subjected to ordinary interleave processing but directly subjected to modulation and recorded on a disk by use of changeover switches after it is added with parities and subcodes. In the figure, the addition of subcode 103 is carried out before the interleave. However, it may be carried out after the interleave, depending on the data to be recorded. Furthermore, even in the above case in which data is not subjected to the ordinary interleave processing by use of the changeover switches, the data may be subjected to simple interleave processing which is suitable for small data to be recorded. The above processing operations may be switched by a changeover signal from the system control 107 or automatically switched by means of address detection performed inside the semiconductor circuit 109.

Figure 11:
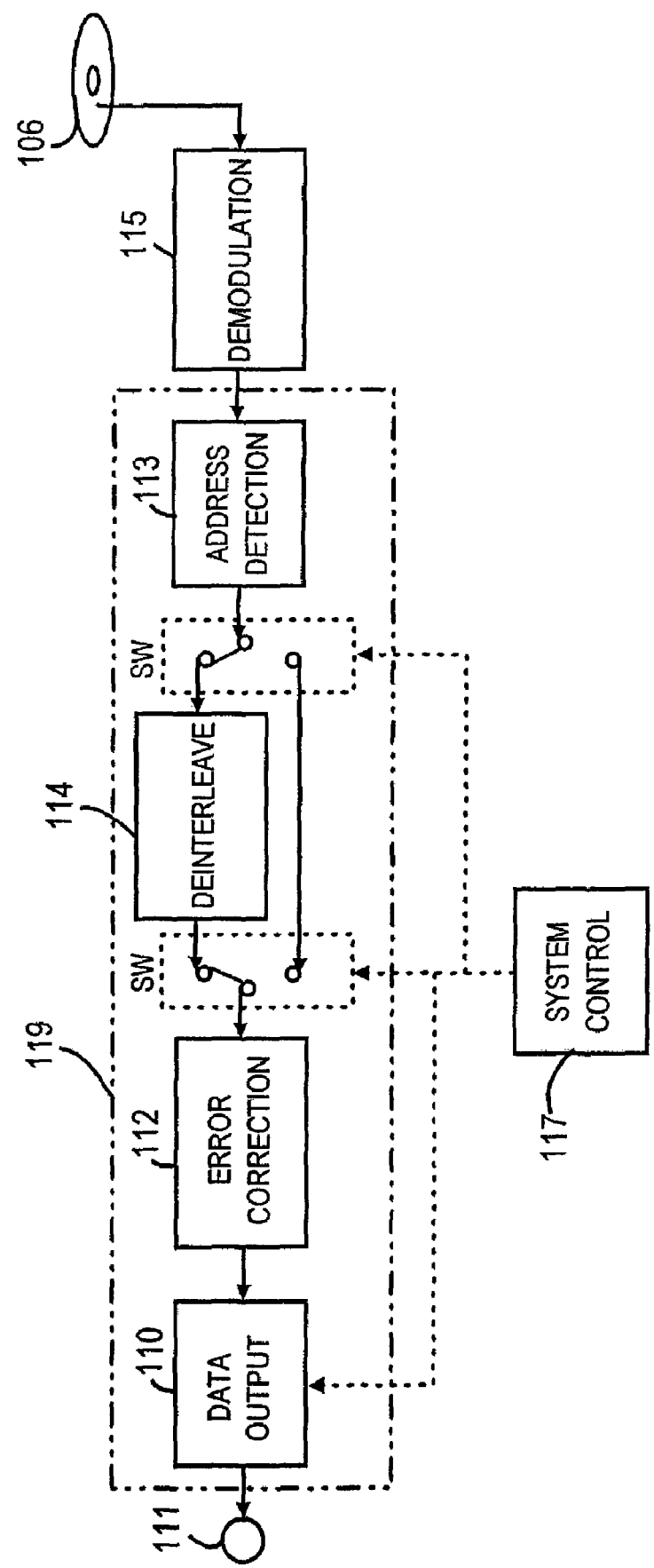
FIG. 11 is a diagram showing a configuration of a reproducing apparatus according to the present invention.

FIG. 11 shows a configuration of a reproducing circuit (apparatus). A reproduced signal from a disk 106 is demodulated by a demodulation section (circuit) 115 and is subjected to address detection by an address detection section 113. Reference numeral 114 denotes a deinterleave section for rearranging data. The data is subjected to error correction by an error correction section 112, and output from a terminal 111 after the data is put together in predetermined units. Reference numeral 119 denotes a semiconductor circuit for processing reproducing signals. The term "a demodulating means" here denotes a means for demodulating data in a recording medium. For example, the demodulation circuit 115 in FIG. 11 is a demodulating means. The term "a reproduction combining means" here indicates a means for combining data reproduced from a recording medium in predetermined units corresponding to units in which the data was recorded, in order to carry out error correction. This means corresponds to the process (address detection section) 113, shown in FIG. 11, for detecting the address of data and combining the data in predetermined units. It should be noted that if there are a plurality of different data units (that is, each data unit consists of a different number of bytes, etc.) in which data is put together, a different circuit may be used for each data unit, or alternatively a single circuit may be used which is capable of changing the number (of bytes) constituting the error correction data unit based on the address value. Further, an error correcting means is a means for correcting an error in data reproduced from a recording medium. For example, the error correction section 112 shown in FIG. 11 is an error correcting means. An error correcting means may include a mechanism for storing data in a RAM, etc. and writing/reading the data. It should be noted that if there are a plurality of different data units (that is, each data unit consists of a different number of bytes, etc.) in which data is put together, a different circuit may be used for each data unit as an error correcting means, or alternatively a single circuit may be used for all different data units as an error correcting means by switching among different data units or among different data string units (each having a different number of bytes, etc.).

The system is controlled such that when data to be reproduced is management information and small, the unit of data to be reproduced from a recording medium and error-corrected is set to be small and subjected to error correction. When management information data of small size is read out, the location of the data is checked by means of address detection. By controlling changeover switches, the data is not subjected to the ordinary interleave processing before it is stored. Then, the data is error-corrected in predetermined record blocks and output.

FIG. 12 shows the structure of CPR_MAI (Copyright Management Information) 403 in the data area in a DVD. Of available 48 bits, only 4 bits are currently used. Reference numeral b47 denotes CPM (Copyrighted Material) which indicates whether this sector includes a copyrighted material; b46 denotes CP_SEC which indicates whether this sector has a specific data structure for a copyright protection system; and b45 and b44 denote CGMS (Copy Generation Management System) which records copy restriction information. Information on control of data copying must be recorded in the data area. However, copy information such as CGMS need not be recorded in the management area. Accordingly, the following arrangement can be made. The size of a record block in the management area may be coded into a code of 2 bits which is then recorded in the CGMS 2-bit area, making it possible to obtain the size of the record block.

Figure 13:
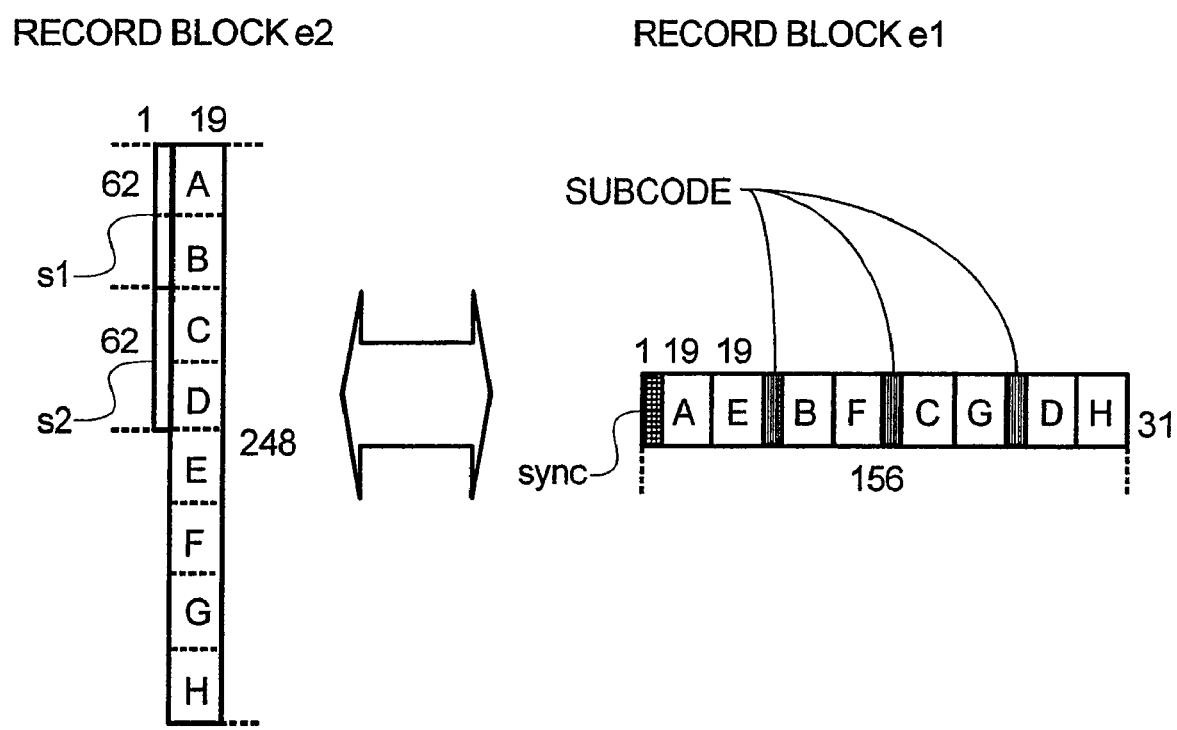
FIG. 13 is a diagram showing a data structure used to record data in units of 4K bytes according to the present invention.

FIG. 13 shows a data structure used to record data in units of 4K bytes. In the figure, reference numerals A to H each denote a data unit having 19 bytes in each row and 31 bytes in each column. A record block e2 comprises: two subcode strings each having 62 bytes including parities; and 19 code strings each having 248 bytes arranged in a column. These data units (the record block e2) are rearranged into a record block e1 having a data structure comprising 31 bytes in each column and 156 bytes in each row. By using such a data structure, it is possible to record data having a size of 4K bytes. Incidentally, if the subcode strings s1 and s2 in the record block e2 are divided and rearranged as they are, the positions of the syncs after the rearrangement do not match the arrangement of the user data in the record block e1.

Figure 14:
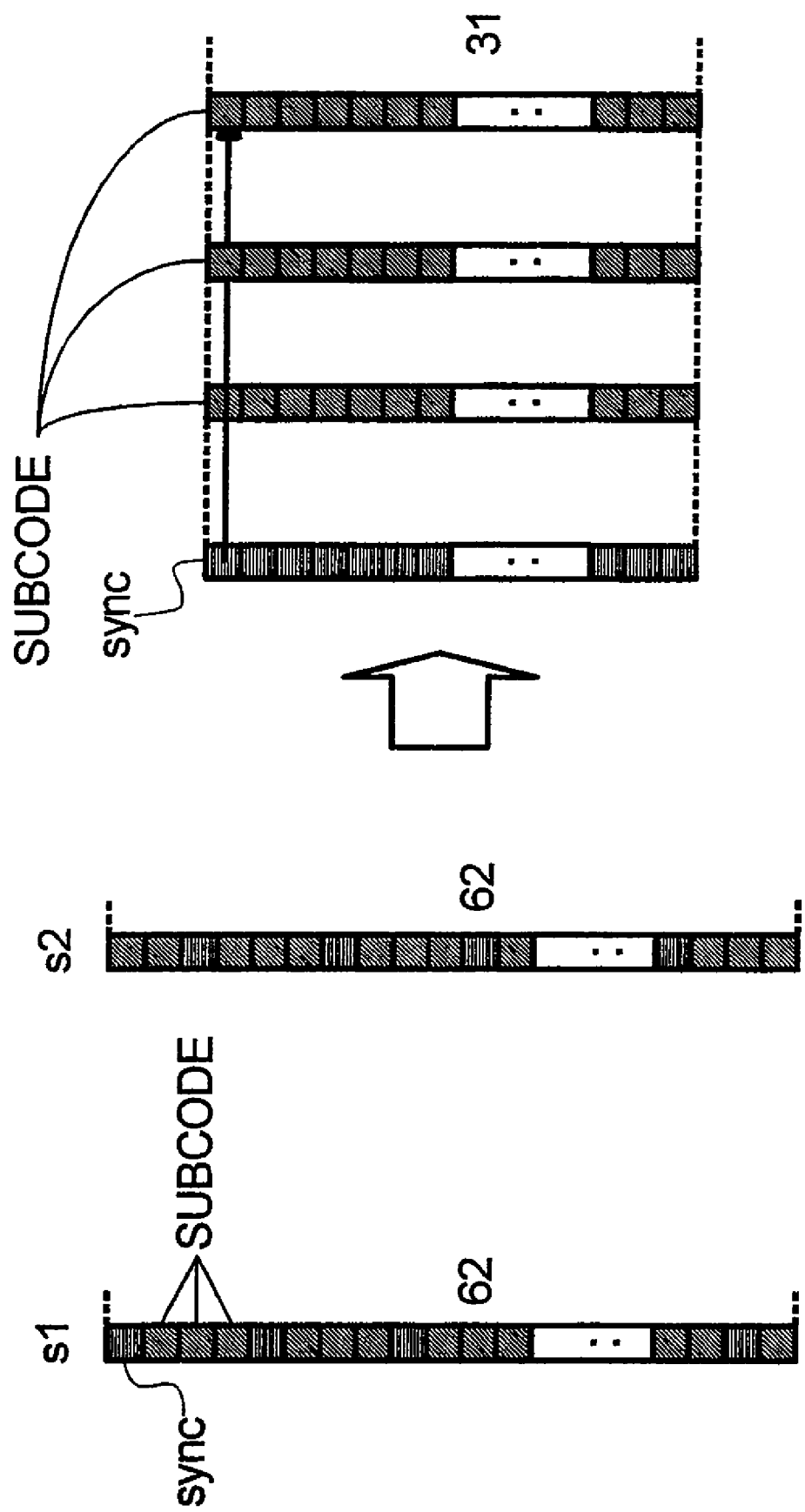
FIG. 14 is a sync and subcode arrangement used to record data in units of 4K bytes according to the present invention.

To solve this problem, as shown in FIG. 14, the syncs are inserted into specific portions in the structure of the code strings s1 and s2, and data, such as address information, and parities added to the data are put in the other portions. By using such a data structure of the subcodes, it is possible to match the positions of the syncs with the arrangement of the user data.

Figure 15:
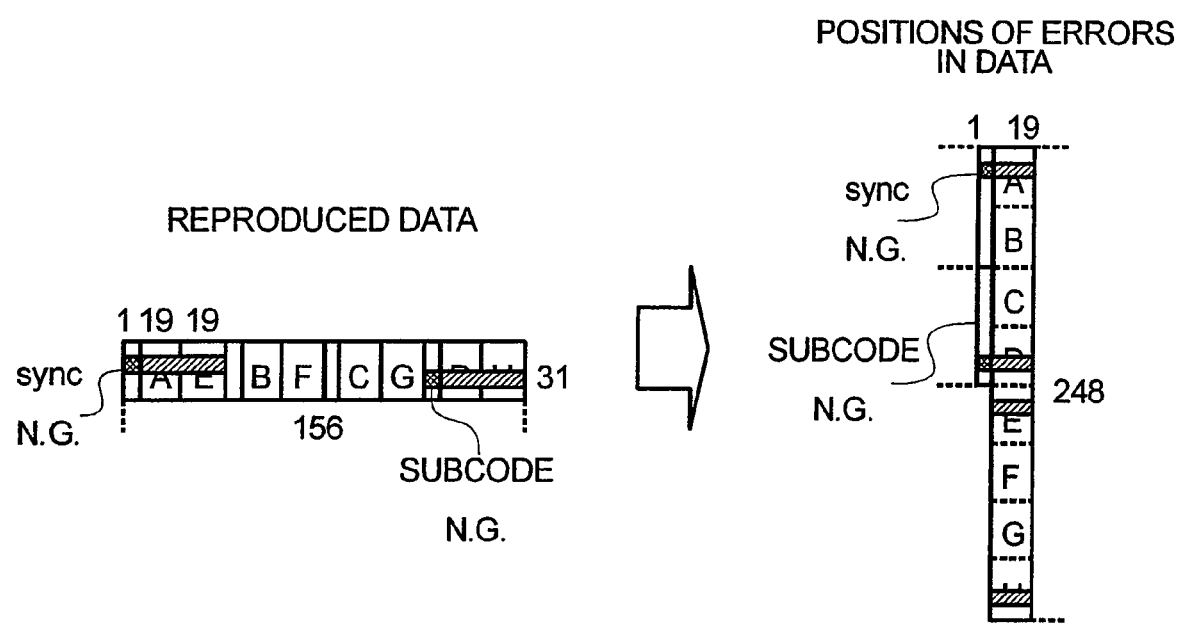
FIG. 15 is a diagram showing an example in which errors are included in portions of a sync and a subcode when a 4K-byte data structure according to the present invention is reproduced, indicating data positions at which the errors may be present.

FIG. 15 shows an example in which errors are included in portions of a sync and a subcode when the 4K-byte data structure illustrated in FIGS. 13 and 14 is reproduced. In the figure, a sync N.G. and a subcode N.G. are indicated as error examples. Specifically, when a sync is not properly detected or erroneous data is included in error correcting code for subcode, the subsequent string must be processed since the string may be erroneous. When a sync detection N.G. or a subcode N.G. occurs, as described above, the error portions included in the data units A to H can be estimated from the position of the sync N.G. or the subcode N.G. as indicated by the shaded portions in the figure. By correcting errors in data based on this information, it is possible to properly decode the data. In such a case, the data may be recorded a plurality of times.

Figure 16:
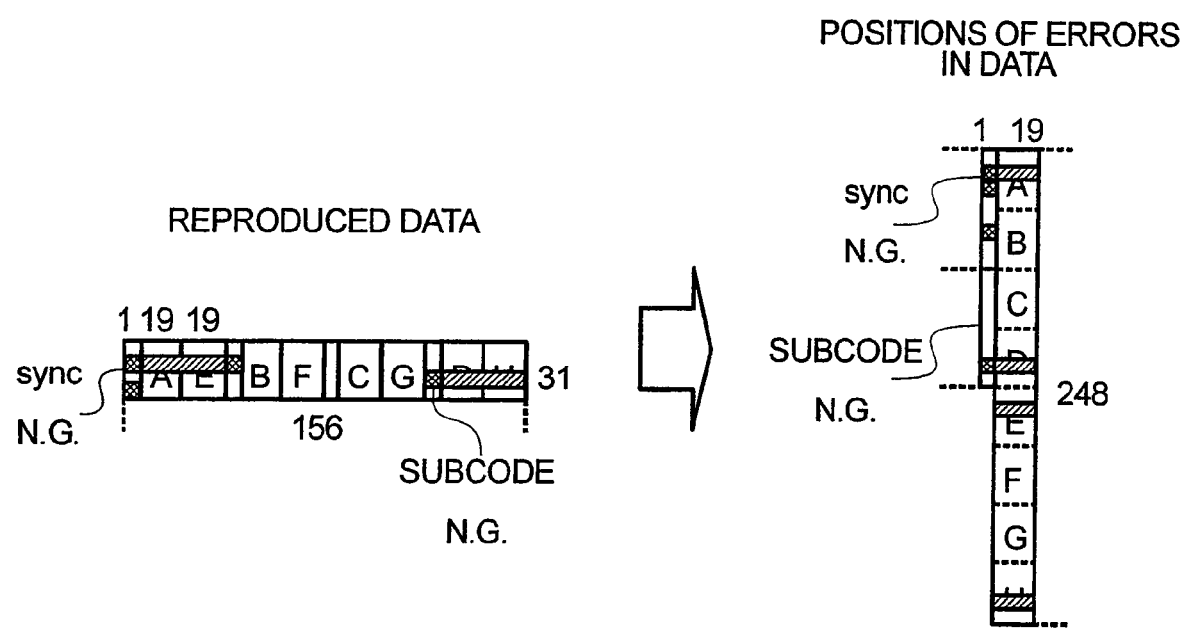
FIG. 16 is another diagram indicating data positions at which errors may be present when the 4K-byte data structure according to the present invention is reproduced.

FIG. 16 shows another example (different from the example of FIG. 15) in which the case where a sync is not properly detected or erroneous data is included in error correcting code for subcode occurs a plurality of times serially, and the data between the errors is processed since the data may be erroneous. Use of such an algorithm increases the reliability of information on the positions of errors in data, making it possible to correct the data by discarding the erroneous portions.

Figure 17:
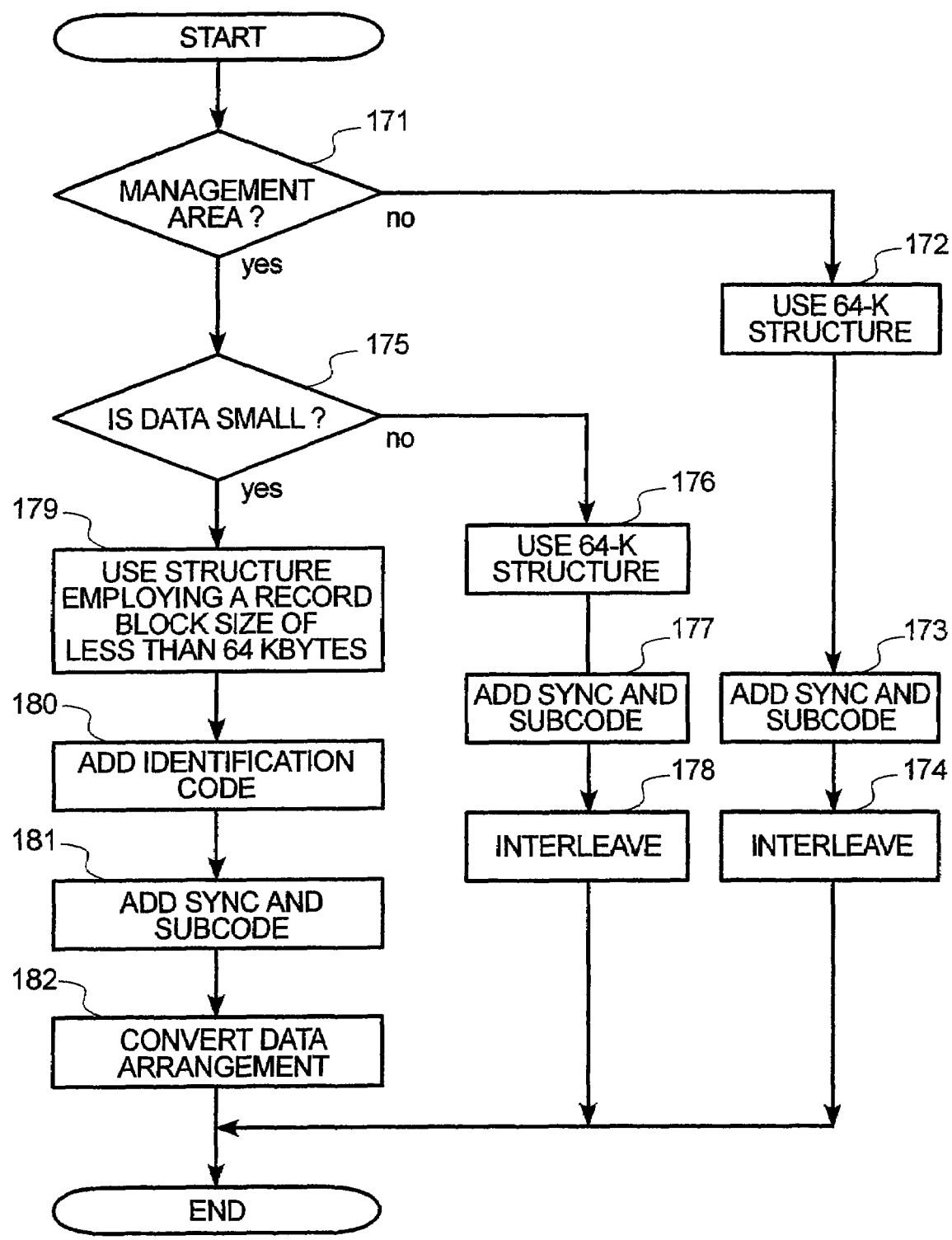
FIG. 17 is a diagram showing a method for processing data to be recorded according to the present invention.

FIG. 17 is a flowchart showing a method for processing the data to be recorded described so far, changing the structure of the data. First of all, when data is recorded, it is determined whether the target area is the management area at step 171, and if it is the user data area, the data is processed in units of 64K bytes. Syncs and subcodes are added at step 173, and the data is interleaved to produce a record data structure at step 174. If the target area is determined to be the management area at step 171, on the other hand, the size of the data to be recorded is determined at step 175. In this case, if the size of the data to be recorded requires that the data be recorded in record units of 64K bytes, a 64K-byte record block is used to record the data as in the case of the user data area. The sizes which require that data be recorded in record units of 64K bytes include sizes a little smaller than 64K bytes (for example, 60K bytes or so) and sizes larger than 64K bytes.

If the size of the data to be recorded is determined to be small at step 175, an appropriate record block size is selected based on the size of the data to be recorded at step 179. As described above, a record block can be configured such that its size is set to be one of various sizes smaller than 64K bytes, such as 32K bytes (illustrated in FIG. 8), 16K bytes (illustrated in FIG. 7), 8K bytes (illustrated in FIG. 1), and 4K bytes (illustrated in FIG. 13). Accordingly, by selecting an appropriate record block size based on the size of data to be recorded, it is possible to reduce an amount of data recorded in the management area.

Then, an identification code is added at step 180. The identification code indicates the size of a record block. The addition of syncs and subcodes and the conversion of the data arrangement are carried out based on the size of the record block indicated by this identification code. Specifically, at step 181, the data to be recorded and the identification code are added with syncs and subcodes for small sizes. At step 182, the data is rearranged based on the size to produce data to be recorded. By carrying out such processing, it is possible to record even data of small size in a disk management area.

According to the present invention described above, when data is recorded on a recording medium, even data of small size to be recorded can be subjected to recording signal processing in much the same way as ordinary data (of ordinary size) to be recorded, making it possible to record data in a management information area in small units. Accordingly, it is possible to reduce the time required for recording management information, and efficiently use the management information area.

What is claimed is:

1. A recording method for recording data on a recording medium having a user data area and an information area for storing information of said recording medium, said recording method comprising steps of:
   providing the recording medium that includes in said information area a second correction block, said second correction block including a synchronization signal and second data to which second correction codes are added; and
   recording a first correction block in said user data area, wherein:
   the first correction block includes a synchronization signal, first data to which first correction codes are added and subcodes for detecting a burst error;
   the first correction block is larger than the second correction block; and
   the first correction block consists of 496 rows.

2. The recording method of claim 1, wherein a total data size of said first data and said first correction codes of the first correction block is 38*4*496 byte, and a total data size of said subcodes of the first correction block is 3*496 byte.

3. A recording method for recording data on a recording medium having a user data area and an information area for storing information of said recording medium, said recording method comprising steps of:
   recording a first correction block in said user data area; and
   recording a second correction block in said information area; wherein:
   said first correction block includes a synchronization signal, first data to which first correction codes are added and subcodes for detecting a burst error;
   said second correction block includes a synchronization signal and data to which second correction codes are added;
   said first correction block is larger than said second correction block; and
   said first correction block consists of 496 rows.

4. The recording method of claim 3, wherein a total data size of said first data and said first correction codes of the first correction block is 38*4*496 byte, and a total data size of said subcodes of the first correction block is 3*496 byte.

5. A reproducing method for reproducing data stored on a recording medium having a user data area and an information area for storing information of said recording medium, said reproducing method comprising steps of:
   providing the recording medium that includes in said user data area a first correction block and in said information area a second correction block, wherein:
   said first correction block is larger than said second correction block and includes a synchronization signal, data to which first correction codes are added, and a subcode for detecting a burst error;
   said second correction block includes a synchronization signal and data to which second correction codes are added; and
   said first correction block consists of 496 rows;
   reproducing data from said user data area of said recording medium;
   demodulating the reproduced data; and
   correcting the reproduced data based on the first correction codes.

6. The reproducing method of claim 5, wherein a total data size of said first data and said first correction codes of the first correction block is 38*4*496 byte, and a total data size of said subcodes of the first correction block is 3*496 byte.

* * * * *